(12) United States Patent
Kyono

(10) Patent No.: US 9,337,742 B2
(45) Date of Patent: May 10, 2016

(54) SWITCHING POWER-SUPPLY DEVICE

(71) Applicant: Sanken Electric Co., LTD., Niiza-shi, Saitama (JP)

(72) Inventor: Yoichi Kyono, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 0 days.

(21) Appl. No.: 14/601,677

(22) Filed: Jan. 21, 2015

(65) Prior Publication Data

US 2015/0207419 A1 Jul. 23, 2015

(30) Foreign Application Priority Data

Jan. 21, 2014 (JP) .................................. 2014-008686

(51) Int. Cl.
*H02M 3/335* (2006.01)
*H02M 1/00* (2006.01)

(52) U.S. Cl.
CPC ...... *H02M 3/33507* (2013.01); *H02M 3/33569* (2013.01); *H02M 2001/0032* (2013.01); *H02M 2001/0058* (2013.01); *H02M 2001/0096* (2013.01); *Y02B 70/1433* (2013.01); *Y02B 70/1491* (2013.01); *Y02B 70/16* (2013.01)

(58) Field of Classification Search
CPC ................. H02M 3/33507; H02M 2001/0058; H02M 3/3376
USPC ...................................... 363/17, 21.02, 21.03
See application file for complete search history.

(56) References Cited

U.S. PATENT DOCUMENTS

| | | | |
|---|---|---|---|
| 9,071,155 B2 * | 6/2015 | Uno | .................. H02M 3/33561 |
| 2002/0075698 A1 | 6/2002 | Kuranuki et al. | |
| 2008/0186742 A1 | 8/2008 | Seong | |
| 2009/0059622 A1 | 3/2009 | Shimada et al. | |

(Continued)

FOREIGN PATENT DOCUMENTS

| | | |
|---|---|---|
| JP | H09-308243 A | 11/1997 |
| JP | 2002-209383 A | 7/2002 |

(Continued)

OTHER PUBLICATIONS

Dec. 15, 2015—(US) Non-Final Office Action—U.S. Appl. No. 14/168,038.

(Continued)

*Primary Examiner* — Adolf Berhane
*Assistant Examiner* — Afework Demisse
(74) *Attorney, Agent, or Firm* — Banner & Witcoff, Ltd.

(57) ABSTRACT

A switching power-supply device includes: a first series circuit including a first switching element; and a second switching element, a second series circuit including a third switching element and a fourth switching element; and a control unit that, while making frequencies of switching signals of the first series circuit and the second series circuit be the same, performs control of turning on-and-off the first switching element and the second switching element, alternately, with dead time at which the first switching element and the second switching element become off and turning on-and-off the third switching element and the fourth switching element, alternately, with dead time at which the third switching element and the fourth switching element become off, wherein the control unit controls a phase difference between the switching signal of the first series circuit and the switching signal of the second series circuit.

7 Claims, 11 Drawing Sheets

(56) References Cited

U.S. PATENT DOCUMENTS

| | | |
|---|---|---|
| 2009/0290385 A1 | 11/2009 | Jungreis et al. |
| 2010/0014321 A1 | 1/2010 | Won et al. |
| 2010/0328968 A1 | 12/2010 | Adragna et al. |
| 2011/0103097 A1 | 5/2011 | Wang et al. |
| 2011/0103098 A1 | 5/2011 | Wu et al. |
| 2012/0014138 A1 | 1/2012 | Ngo et al. |
| 2012/0170324 A1 | 7/2012 | Fornage et al. |
| 2012/0262953 A1 | 10/2012 | Jungreis et al. |
| 2013/0265804 A1 | 10/2013 | Fu et al. |
| 2013/0314949 A1 | 11/2013 | Chi et al. |
| 2014/0009968 A1 | 1/2014 | Matsuura et al. |
| 2014/0009985 A1 | 1/2014 | Figge et al. |
| 2014/0036545 A1 | 2/2014 | Reddy |
| 2014/0098574 A1 | 4/2014 | Hara et al. |
| 2014/0254203 A1 | 9/2014 | Dai et al. |
| 2014/0376270 A1 | 12/2014 | Kern et al. |
| 2015/0055374 A1* | 2/2015 | Yamashita ............ H02M 3/337 363/17 |
| 2015/0078036 A1 | 3/2015 | Jovanovic et al. |
| 2015/0092450 A1 | 4/2015 | Feno |
| 2015/0207419 A1 | 7/2015 | Kyono |
| 2015/0214844 A1 | 7/2015 | Kyono |
| 2015/0229216 A1 | 8/2015 | Kyono |

FOREIGN PATENT DOCUMENTS

| | | |
|---|---|---|
| JP | 2005-033956 A | 2/2005 |
| JP | 2013-063003 A | 4/2013 |

OTHER PUBLICATIONS

Figge, H.; Grote, T.; Froehleke, N.; Boecker, J.; Ide, P., "Paralleling of LLC resonant converters using frequency controlled current balancing," Power Electronics Specialists Conference, 2008. PESC 2008. IEEE, vol., No., pp. 1080-1085, Jun. 15-19, 2008.

Aug. 5, 2015—(US) Non-Final Office Action—U.S. Appl. No. 14/178,446.

Nov. 19, 2015—(US) Final Office Action—U.S. Appl. No. 14/178,446.

Mar. 9, 2016—(US) Notice of Allowance—U.S. Appl. No. 14/178,446.

* cited by examiner

_(12) United States Patent_
_(10) Patent No.: US 9,337,742 B2_

SWITCHING POWER-SUPPLY DEVICE

CROSS-REFERENCE TO RELATED APPLICATION

This application claims priority from Japanese Patent Application No. 2014-008686 filed on Jan. 21, 2014, the entire subject matter of which is incorporated herein by reference.

TECHNICAL FIELD

This disclosure relates to a switching power-supply device.

BACKGROUND ART

A power supply of an electronic device such as a television, a smart phone, a PC and the like should stably supply a constant direct current voltage. As the power supply, a switching power-supply device is used (for example, refer to JP-A-9-308243 and JP-A-2002-209383).

A switching power-supply device uses, as a switching element, a semiconductor device such as a MOSFET (Metal-Oxide-Semiconductor Field-Effect Transistor), an IGBT (Insulated Gate Bipolar Transistor), a thyristor and the like to convert an input direct current voltage into an alternating current voltage by an on-off operation of the switching element. The converted alternating current voltage passes through a transformer, a rectification circuit and a smoothing circuit in corresponding order, is converted into a stable direct current voltage and is then output.

The switching power-supply device disclosed in JP-A-9-308243 is a current resonance-type converter and performs control of returning a frequency of a switching signal into an appropriate operating range when the frequency of the switching signal becomes lower than a resonance frequency and an off-resonance state is made.

The switching power-supply device disclosed in JP-A-2002-209383 has a full bridge-type converter and controls an output voltage by controlling on-off operations of four switching units configuring the full bridge.

SUMMARY

According to the method of controlling the frequency of the switching signal as described in JP-A-9-308243, when an input voltage is lowered due to instantaneous interruption or power failure, the frequency of the switching signal is made to approximate to the resonance frequency in order to increase an output voltage. At this time, a conduction angle of load current that is discharged to a secondary side is extremely narrowed and a current effective value is increased, so that the efficiency is remarkably lowered. For this reason, in order to prevent the efficiency from being lowered, it is preferable to increase the output voltage without changing the frequency of the switching signal.

This disclosure is to provide a switching power-supply device capable of effectively controlling an output voltage.

A switching power-supply device of this disclosure includes: a transformer having a primary coil and a secondary coil that is magnetically coupled with the primary coil; a first series circuit including a first switching element and a second switching element, the first series circuit being connected to both ends of a direct-current power supply; a series resonance circuit including a capacitor connected to one end of the second switching element and the primary coil connected between the capacitor and the other end of the second switching element; a second series circuit including a third switching element and a fourth switching element, the second series circuit being connected to both ends of the direct-current power supply; a reactor that is connected between a connection point of the third switching element and the fourth switching element and a terminal of the capacitor connected to the primary coil; a rectification-and-smoothing circuit that is connected to the secondary coil, and a control unit that, while making frequencies of switching signals of the first series circuit and the second series circuit be the same, performs control of: turning on-and-off the first switching element and the second switching element, alternately, with dead time at which the first switching element and the second switching element become off; and turning on-and-off the third switching element and the fourth switching element, alternately, with dead time at which the third switching element and the fourth switching element become off, wherein the control unit controls a phase difference between the switching signal of the first series circuit and the switching signal of the second series circuit.

According to this disclosure, it is possible to provide a switching power-supply device capable of effectively controlling an output voltage.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, illustrative embodiments of this disclosure will be described with reference to the drawings.

Figure 1:
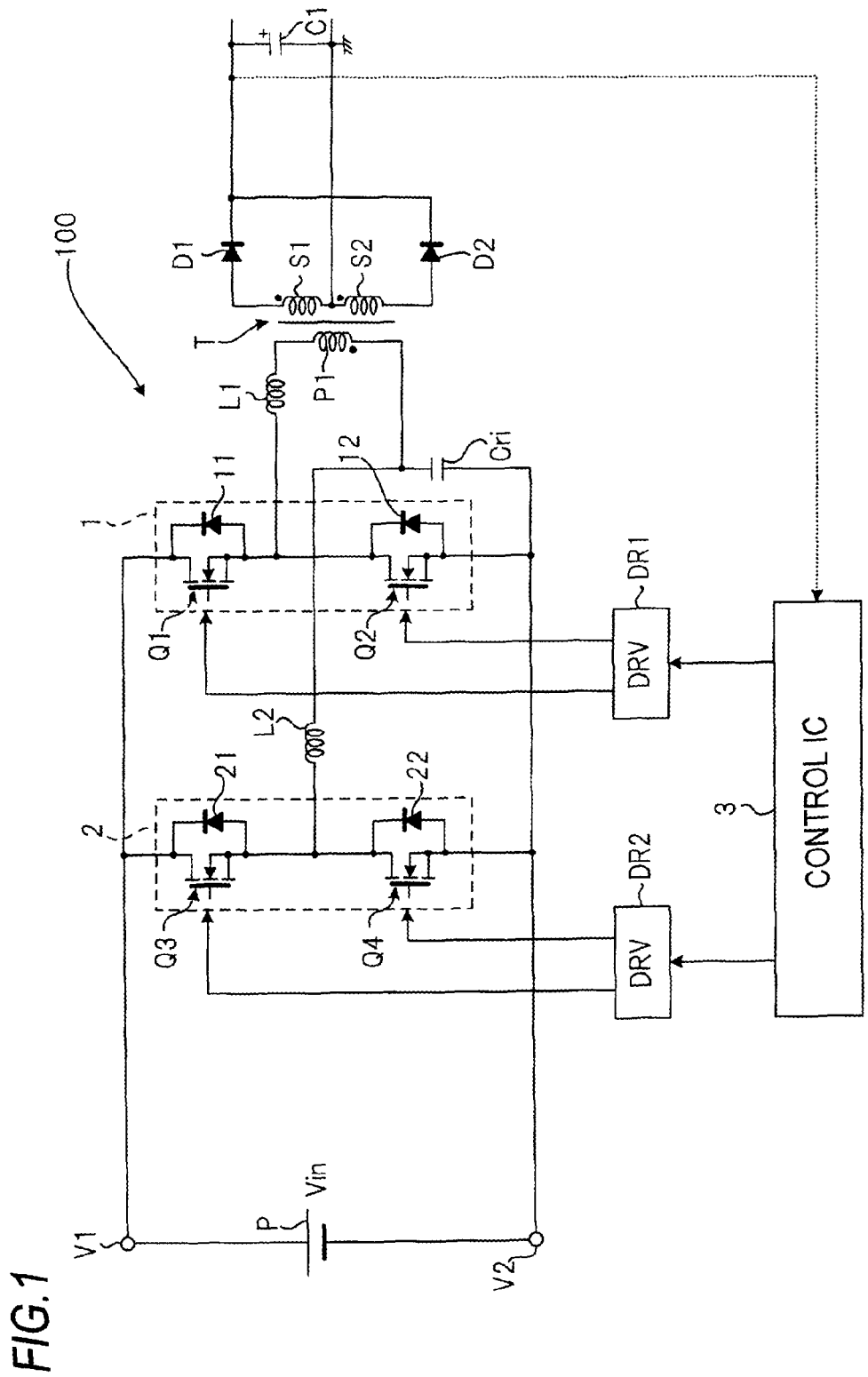
FIG. 1 is a circuit diagram illustrating a schematic configuration of a switching power-supply device for illustrating an illustrative embodiment of this disclosure.

FIG. 1 is a circuit diagram illustrating a schematic configuration of a switching power-supply device 100 for illustrating an illustrative embodiment of this disclosure.

The switching power-supply device 100 has a terminal V1 that is connected to one end of a direct-current power supply P, which supplies a direct current voltage Vin obtained by rectifying and smoothing an alternating current voltage from a commercial power supply for example, a terminal V2 that is connected to the other end (a ground end) of the direct-current power supply P, series circuits 1, 2 that are respectively connected in parallel with the direct-current power supply P, reactors L1, L2, a capacitor Cri, a transformer T, diodes D1, D2, a capacitor C1, a control circuit (control IC) 3, and drivers DR1, DR2. The control circuit 3 and the drivers DR1, DR2 configure a control unit.

The series circuit 1 includes a switching element Q1 (a MOSFET in the example of FIG. 1) configured by a semiconductor device that can be on-and-off-controlled, such as a MOSFET, an IGBT, a thyristor and the like, a switching element Q2 (a MOSFET in the example of FIG. 1) that is connected in series with the switching element Q1, a diode 11 that is connected to both ends of the switching element Q1 and a diode 12 that is connected to both ends of the switching element Q2. The diode 11 may be a parasitic diode of the switching element Q1 and the diode 12 may be a parasitic diode of the switching element Q2.

The series circuit 2 includes a switching element Q3 (a MOSFET in the example of FIG. 1), a switching element Q4 (a MOSFET in the example of FIG. 1) that is connected in series with the switching element Q3, a diode 21 that is connected to both ends of the switching element Q3 and a diode 22 that is connected to both ends of the switching element Q4. The diode 21 may be a parasitic diode of the switching element Q3 and the diode 22 may be a parasitic diode of the switching element Q4.

In the series circuit 1, both ends of the switching element Q2 is connected with a circuit in which the reactor L1, a primary coil P1 of the transformer T and the capacitor Cri are connected in series with each other. One end of the capacitor Cri is connected to one end of the switching element Q2, and the primary coil P1 and the reactor L1 are connected between the other end of the capacitor Cri and the other end of the switching element Q2.

The reactor L1 may be a reactor having a leakage inductance of the primary coil P1. The series circuit configured by the reactor L1, the primary coil P1 of the transformer T and the capacitor Cri configures a series resonance circuit that is connected in parallel with the switching element Q2.

The reactor L2 is connected between a connection point of the switching element Q3 and switching element Q4 of the series circuit 2 and a connection point of the capacitor Cri and primary coil P1 of the series resonance circuit. The series circuit configured by the reactor L2 and the capacitor Cri configures a resonance circuit that is connected in parallel with the switching element Q4.

The transformer T has the primary coil P1 and secondary coils S1, S2 that are magnetically coupled with the primary coil P1.

One end (a connection point-side with the secondary coil S2) of the secondary coil S1 is connected to a ground terminal, and the other end of the secondary coil S1 is connected to an anode of the diode D1. One end (a connection point-side with the secondary coil S1) of the secondary coil S2 is connected to the ground terminal GND, and the other end of the secondary coil S2 is connected to an anode of the diode D2. Cathodes of the diodes D1, D2 are connected to an output terminal (not shown).

The capacitor C1 is connected between the connection point of the secondary coil S1 and secondary coil S2 and the output terminal. The diodes D1, D2 are to rectify voltages that are generated from the secondary coils S1, S2. The capacitor C1 is to smooth the voltages that are generated from the secondary coils S1, S2. A rectification-and-smoothing circuit is configured by the diodes D1, D2 and the capacitor C1.

The driver DR1 performs on-off control of the switching elements Q1, Q2 included in the series circuit 1, in accordance with a clock input from the control circuit 3.

The driver DR2 performs on-off control of the switching elements Q3, Q4 included in the series circuit 2, in accordance with a clock input from the control circuit 3.

Figure 2:
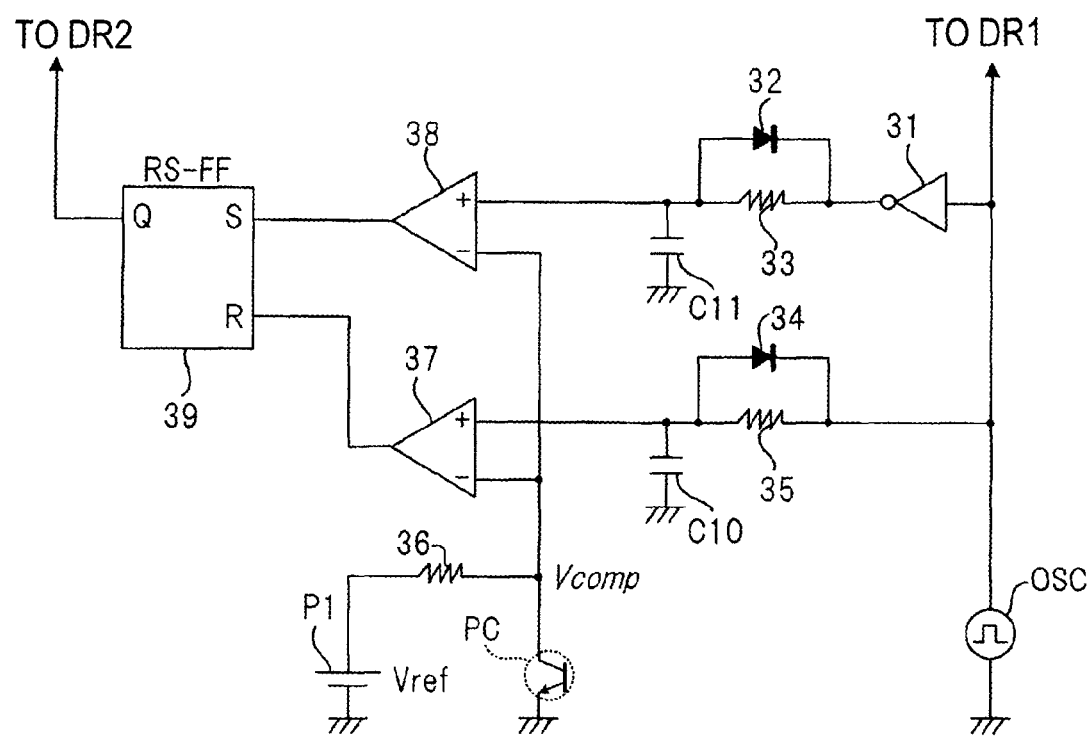
FIG. 2 is a circuit diagram illustrating an internal configuration of a control circuit of the switching power-supply device shown in FIG. 1.

FIG. 2 is a circuit diagram illustrating an internal configuration of the control circuit 3 of the switching power-supply device 100 shown in FIG. 1.

The control circuit 3 has an oscillator OSC that is connected to the driver DR1, a first time-constant circuit including a diode 32, a resistor 33 and a capacitor C11, a NOT circuit 31 that is connected between the first time-constant circuit and the oscillator OSC, a second time-constant circuit including a diode 34, a resistor 35 and a capacitor C10, which are connected to the oscillator OSC, a comparator 38 having a non-inverting input terminal connected to an output of the first time-constant circuit, a comparator 37 having a non-inverting input terminal connected to an output of the second time-constant circuit, an RS flip-flop (RS-FF) 39 connected to outputs of the comparators 37, 38, a resistor 36 that is connected between a power supply P1 supplying a reference voltage Vref and inverting input terminals of the comparators 37, 38, and a photo coupler PC that is connected to the inverting input terminals of the comparators 37, 38.

The oscillator OSC generates a clock of an arbitrary frequency with a predetermined duty ratio (for example, 50%) and inputs the generated clock to the driver DR1. The driver DR1 generates switching signals for controlling gates of the switching elements Q1, Q2, in accordance with the input clock, supplies the switching signals to the switching elements Q1, Q2 and turns on-and-off the switching elements Q1, Q2, alternately, with dead time so that both of the switching elements Q1, Q2 are not turned on.

The clock generated in the oscillator OSC is also input to the first time-constant circuit through the NOT circuit 31. Also, the clock generated in the oscillator OSC is also input to the second time-constant circuit.

The diodes 32, 34 of the first time-constant circuit and second time-constant circuit are diodes for discharge for instantaneously pulling out voltages of the capacitors C10, C11 when the input signal becomes a low level.

In the first time-constant circuit and second time-constant circuit, the resistors 33, 35 and the capacitors C10, C11 are set with the same constant, respectively. Therefore, voltages having the same time-constant are input to the non-inverting input terminals of the comparator 37 and the comparator 38 from ascending and descending timings of the clock generated in the oscillator OSC.

The photo coupler PC is an element for transmitting a difference between a voltage, which is output to the secondary side of the switching power-supply device 100, and a target voltage to the control circuit 3. The smaller the load, the current (an error signal) that flows through the photo coupler PC is increased. Therefore, a voltage Vcomp of a connection point of the resistor 36 and the photo coupler PC is varied according to a load (an output voltage of the rectification-and-smoothing circuit) of the secondary side of the switching power-supply device 100.

Figure 3:
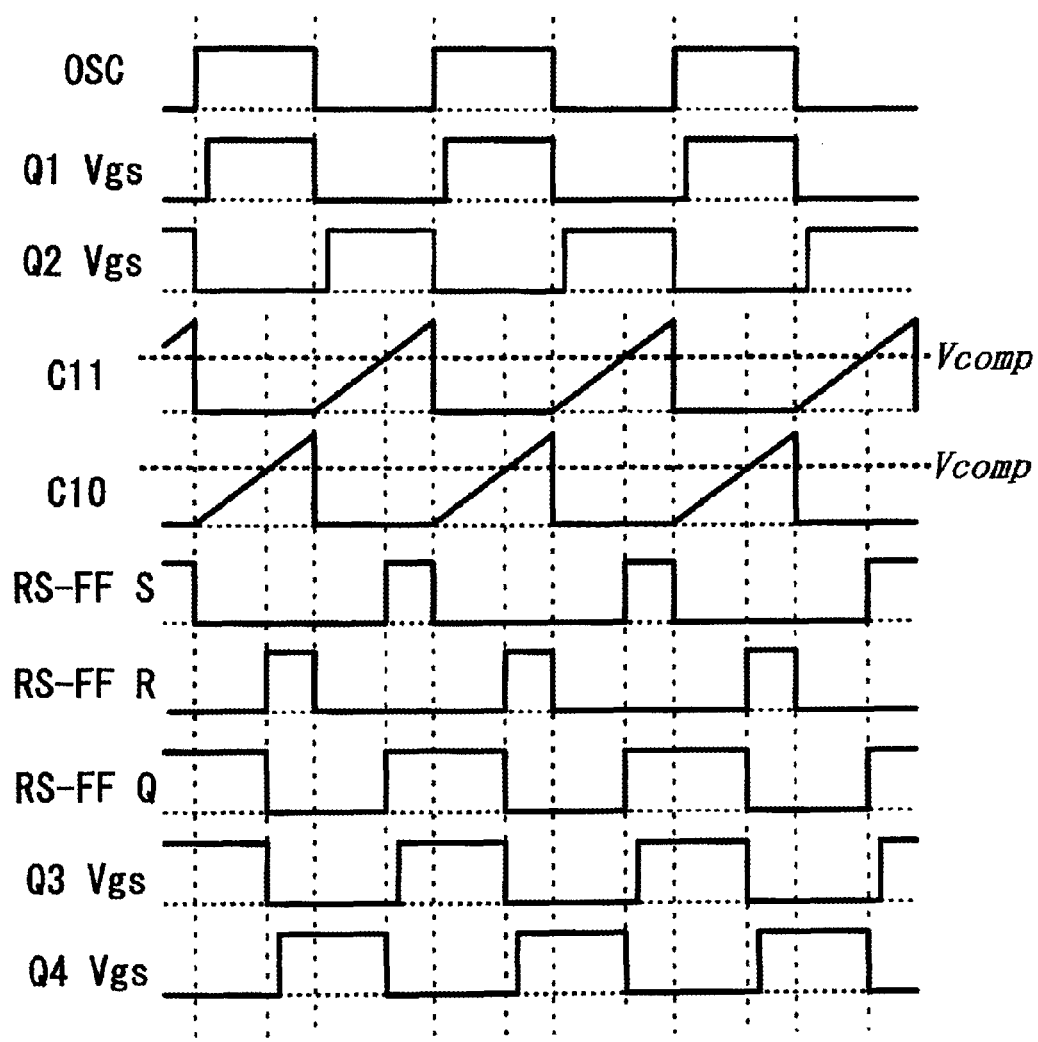
FIG. 3 illustrates an example of an operating waveform of the control circuit of the switching power-supply device shown in FIG. 1.

FIG. 3 illustrates an example of an operating waveform of the control circuit 3 of the switching power-supply device 100 shown in FIG. 1.

In FIG. 3, "OSC" indicates a clock waveform that is generated from the oscillator OSC. "Q1 Vgs" indicates a gate signal of the switching element Q1. "Q2 Vgs" indicates a gate signal of the switching element Q2. "C10" indicates a voltage waveform of the capacitor C10. "C11" indicates a voltage waveform of the capacitor C11. "RS-FF S" indicates an input waveform of a set terminal of the RS-FF 39. "RS-FF R" indicates an input waveform of a reset terminal of the RS-FF 39. "RS-FF Q" indicates an output waveform of the RS-FF 39. "Q3 Vgs" indicates a gate signal of the switching element Q3. "Q4 Vgs" indicates a gate signal of the switching element Q4.

The clock that is generated from the oscillator OSC becomes on-and-off, alternately, with a duty ratio of 50%. The driver DR1 generates the gate signals Q1 Vgs, Q2 Vgs (switching signals), which become on-and-off, alternately, with dead time of several 100 ns, from the clock, supplies the gate signal Q1 Vgs to the switching element Q1 and supplies the gate signal Q2 Vgs to the switching element Q2.

When the clock that is generated from the oscillator OSC becomes a high level, the voltage of the capacitor C10 increases, and when the clock becomes a low level, the voltage of the capacitor C10 becomes zero. Also, when the clock that is generated from the oscillator OSC becomes a low level, the voltage of the capacitor C11 increases, and when the clock becomes a high level, the voltage of the capacitor C11 becomes zero.

For a time period in which the voltage of the capacitor C10 is the voltage Vcomp or higher, a reset input of the RS-FF 39 becomes a high level, and for a time period in which the voltage of the capacitor C10 is lower than the voltage Vcomp, the reset input of the RS-FF 39 becomes a low level. Also, for a time period in which the voltage of the capacitor C11 is the voltage Vcomp or higher, a set input of the RS-FF 39 becomes a high level, and for a time period in which the voltage of the capacitor C11 is lower than the voltage Vcomp, the set input of the RS-FF 39 becomes a low level.

An output signal of the RS-FF 39 is switched between the high level and the low level at ascending timings of the reset input and the set input. Therefore, the output signal of the RS-FF 39 becomes a signal of which a phase is advanced with respect to the clock generated from the oscillator OSC.

The driver DR2 generates the gate signals Q3 Vgs, Q4 Vgs (switching signals), which become on-and-off, alternately, with dead time of several 100 ns, from the output signal of the RS-FF 39, supplies the gate signal Q3 Vgs to the switching element Q3 and supplies the gate signal Q4 Vgs to the switching element Q4.

By the above-described operations, the switching elements Q1, Q2 of the series circuit 1 have a delay corresponding to a magnitude of the voltage Vcomp with respect to the switching elements Q3, Q4 of the series circuit 2 and become on-and-off, alternately, with the duty ratio of 50%. Like this, the control circuit 3 makes the frequency of the switching signal of the series circuit 1 and the frequency of the switching signal of the series circuit 2 be the same, and controls a phase difference between the switching signal of the series circuit 1 and the switching signal of the series circuit 2, according to the output voltage.

Figure 4:
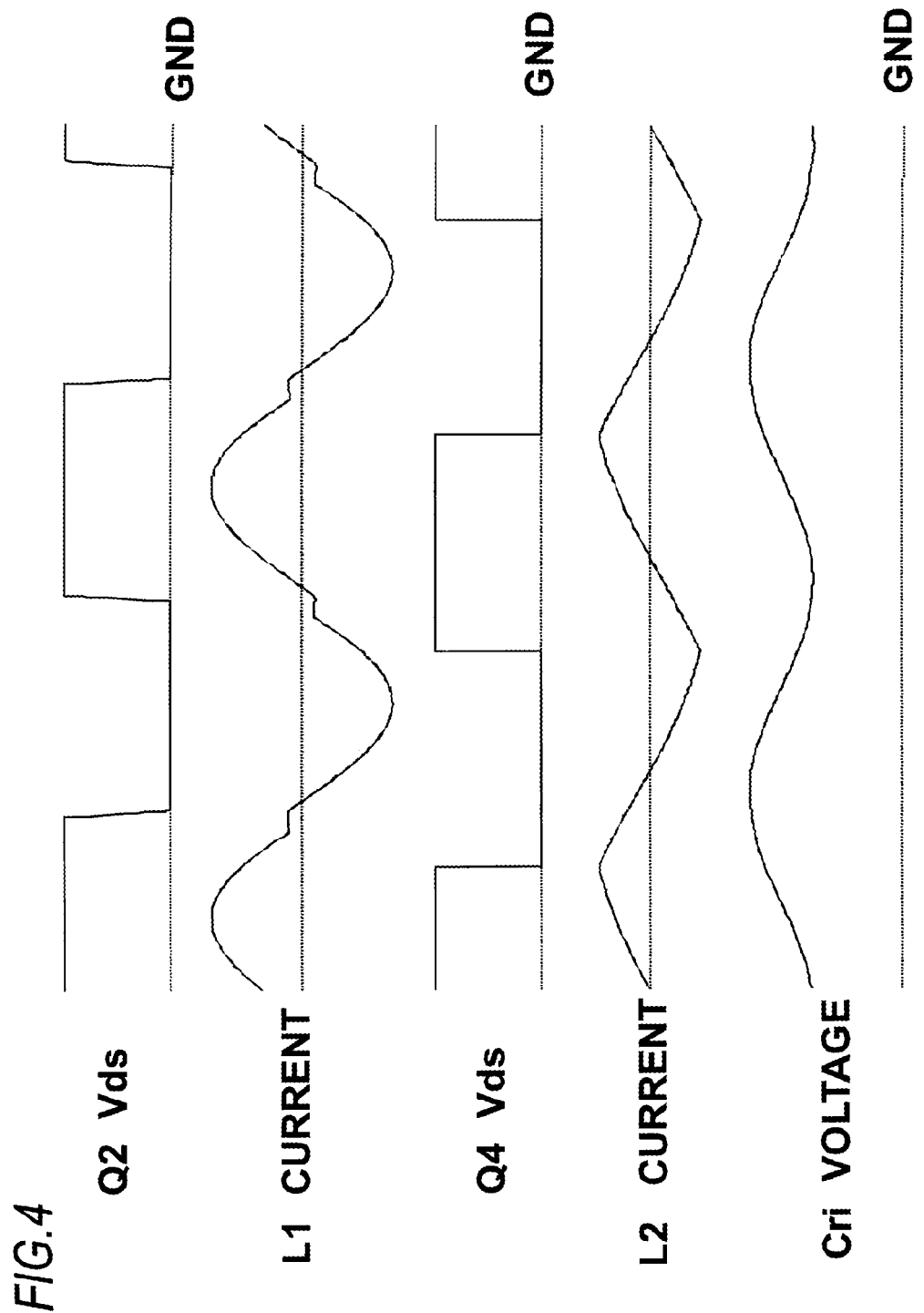
FIG. 4 illustrates an example of an operating waveform of the switching power-supply device at a heavy load state.
Figure 5:
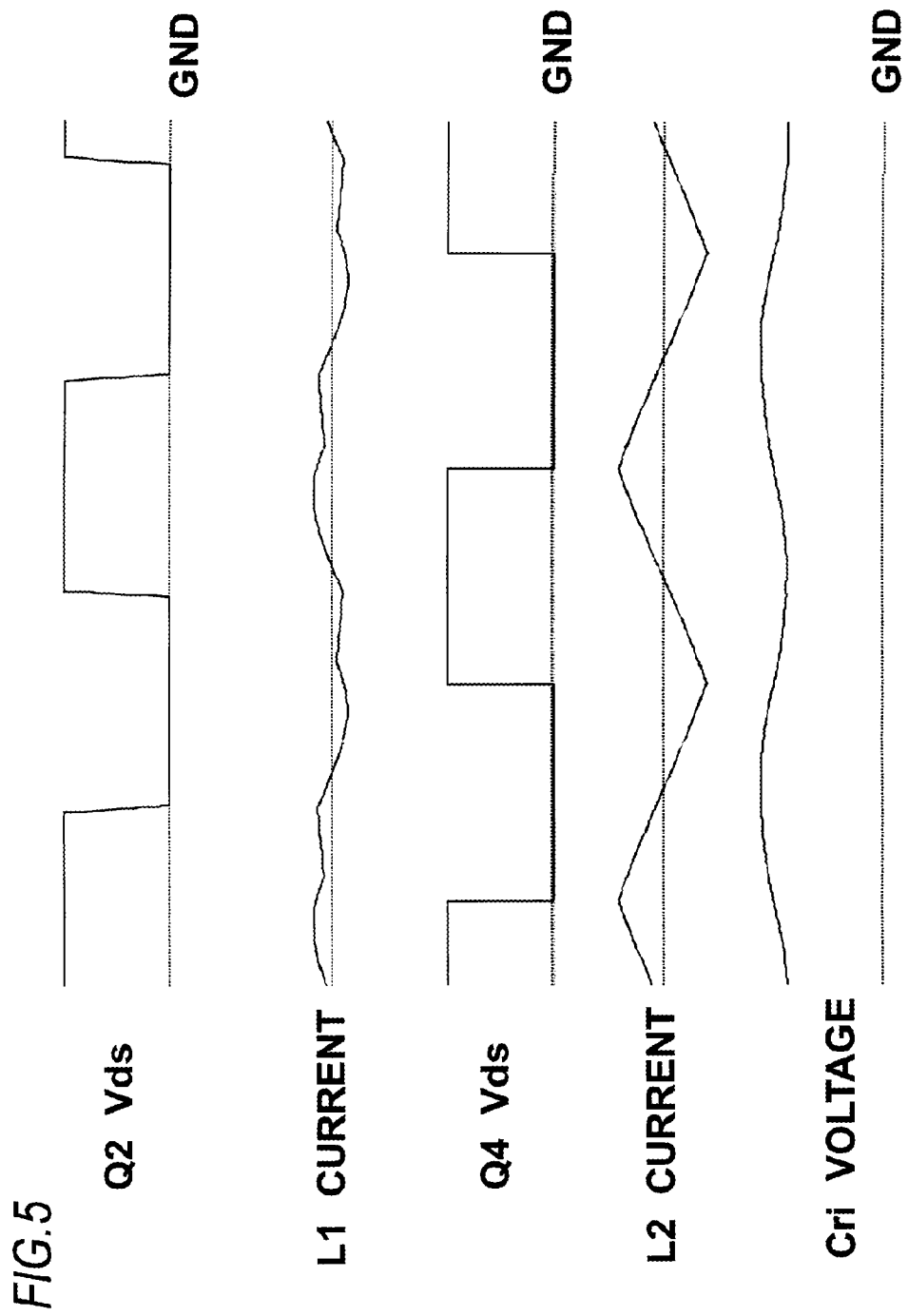
FIG. 5 illustrates an example of an operating waveform of the switching power-supply device at a light load state.

FIGS. 4 and 5 show examples of the operating waveform of the switching power-supply device 100. In FIGS. 4 and 5, a phase difference between the gate signal of the switching element Q2 and the gate signal of the switching element Q4 is different and the phase difference is larger in FIG. 5.

In the switching power-supply device 100, the switching elements Q1, Q2 become on-and-off, alternately, with the duty ratio of 50%, so that resonance current having a positive/negative symmetric property flows in the series resonance circuit configured by the reactor L1, the primary coil P1 and the capacitor Cri1. The resonance current has a shape where load current, which is to be discharged to the secondary side and has a frequency determined by the reactor L1 and the capacitor Cri, overlaps with excitation current circulating through a primary side by a resonance operation of the reactor L1, the inductance of the primary coil P1 and the capacitor Cri.

Also, the switching elements Q3, Q4 become on-and-off, alternately, with the duty ratio of 50%, so that resonance current having a positive/negative symmetric property flows in the reactor L2, and the resonance current is summed with the resonance current of the reactor L1, which the summed current flows into the capacitor Cri. In the example of the operating waveform of FIG. 3, the phase of the switching operation of the series circuit 2 is advanced with respect to that of the series circuit 1.

As shown in FIGS. 4 and 5, as the phase difference between the switching signals of the switching elements Q1, Q2 and the switching signals of the switching elements Q3, Q4 is changed, a phase difference between a current waveform flowing in the reactor L1 and a current waveform flowing in the reactor L2 is also changed. As a result, the resonance current flowing into the capacitor Cri is also changed. Therefore, the output voltage of the switching power-supply device 100 is varied according to the phase difference between the switching signals of the switching elements Q1, Q2 and the switching signals of the switching elements Q3, Q4.

Figure 6B:
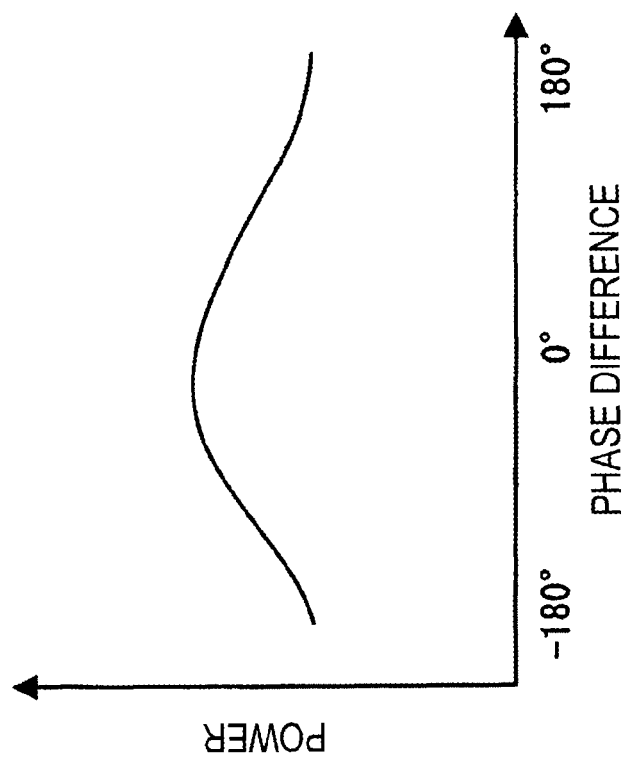
FIG. 6B illustrates a relation between a phase difference of switching signals and the power.
Figure 6A:
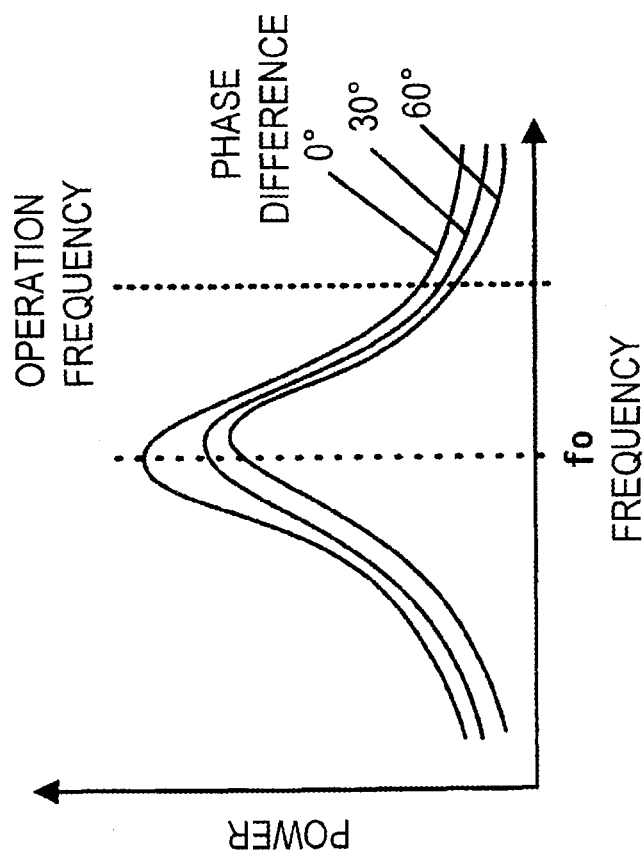
FIG. 6A illustrates a relation between a frequency of a switching signal and power.

FIG. 6A illustrates a relation between frequencies of the switching signals of the switching elements Q1, Q2 and power. FIG. 6B illustrates a relation between the phase difference of the switching signals of the switching elements Q1, Q2 and the switching signals of the switching elements Q3, Q4 and the power.

In FIG. 6A, even when an oscillation frequency of the oscillator OSC is fixed with a frequency denoted with "operating frequency", the power can be controlled by changing the phase difference, as shown in FIG. 6A. The relation between the phase difference and the power is shown in FIG. 6B where a peak is set at a phase difference of about 0° and the power is reduced as the phase difference (absolute value) is increased.

Therefore, the control circuit 3 reduces the phase difference (in absolute value) to thus increase the output at a heavy load state or in a case where the input voltage is lowered, and the control circuit 3 increases the phase difference (in absolute value) to thereby decrease the output at a light load state, thereby keeping the output voltage constant.

In the example of the operating waveform shown in FIG. 3, the phase of the series circuit 2 is advanced with respect to the series circuit 1. However, as can be also seen from FIG. 6B, even when the phase of the series circuit 2 is delayed with respect to the series circuit 1, the same effect can be obtained.

According to the switching power-supply device 100, since the frequency of the switching signal is fixed, it is possible to optimize a conduction angle of the load current of the secondary side, thereby improving the efficiency. Also, it is possible to set the frequency that is not influenced by an AM tuner noise or interference with other converters, so that it is possible to enhance the reliability. Also, the output voltage is controlled by controlling the phase difference of the switching signals. Therefore, compared to a configuration of controlling the frequency of the switching signal, it is possible to take quick measures, thereby improving the responsiveness.

Figure 7:
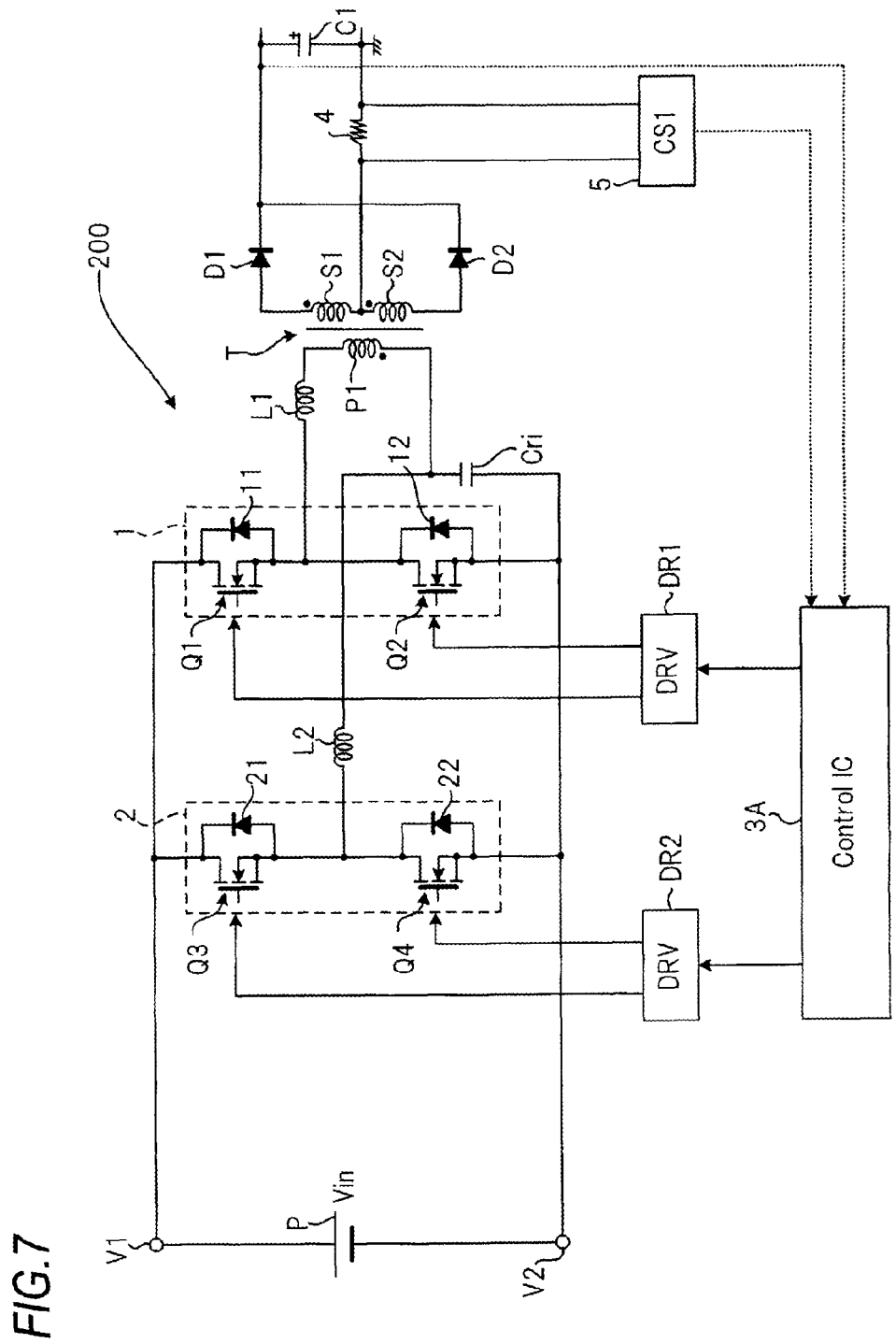
FIG. 7 illustrates a schematic configuration of a switching power-supply device that is a modified embodiment of the switching power-supply device.

FIG. 7 illustrates a schematic configuration of a switching power-supply device 200 that is a modified embodiment of the switching power-supply device 100. In FIG. 7, the same configurations as those of FIG. 1 are denoted with the same reference numerals.

The switching power-supply device 200 has the same configuration as the switching power-supply device 100, except that a resistor 4 is connected between the connection point of the secondary coils S1, S2 of the transformer T and the capacitor C1, a current detection circuit 5 connected to both ends of the resistor 4 is added and the control circuit 3 is changed into a control circuit 3A. The resistor 4 and the current detection circuit 5 function as the detection circuit of the claims. The control circuit 3A and the drivers DR1, DR2 configure the control unit.

Figure 8:
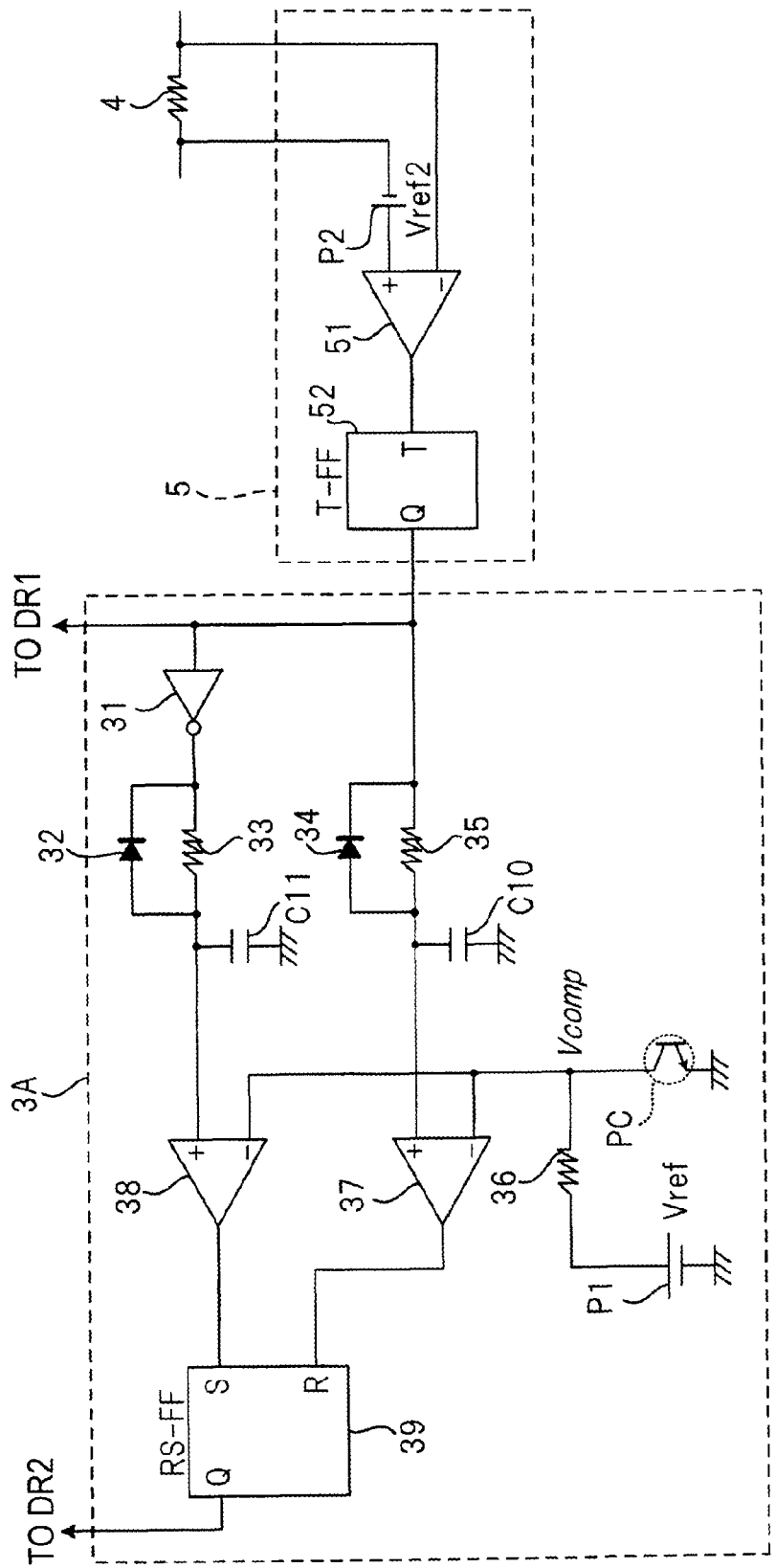
FIG. 8 illustrates an internal configuration of a control circuit and a current detection circuit of the switching power-supply device.

FIG. 8 illustrates an internal configuration of the control circuit 3A and the current detection circuit 5 of the switching power-supply device 200. In FIG. 8, the same configurations as those of FIG. 2 are denoted with the same reference numerals.

In the control circuit 3A, the oscillator OSC of the control circuit 3 is omitted, and the respective inputs of the first time-constant circuit and second time-constant circuit and an output of the current detection circuit 5 are connected thereto. That is, the control circuit 3A uses an output signal of the current detection circuit 5, instead of the clock generated from the oscillator OSC. In the meantime, although not shown, an exterior clock signal is input to the driver DR1 upon startup, so that the switching power-supply device 200 starts to oscillate.

The current detection circuit 5 has a comparator 51 and a T-type flip-flop (T-FF) 52.

The comparator 51 has a non-inverting input terminal, which is connected between the connection point of the secondary coils S1, S2 of the transformer T and the resistor 4 with interposing a power supply P2, and an inverting input terminal that is connected between the resistor 4 and the ground. The power supply P2 supplies a reference voltage Vref2 (a first threshold) that is zero or slightly larger than zero.

The comparator 51 converts the current flowing through the secondary side into a voltage by the resistor 4, compares the converted voltage with the reference voltage Vref2 of the power supply P2 and then inputs a signal corresponding to a result of the comparison to a trigger terminal T of the T-FF 52.

An output terminal Q of the T-FF 52 is connected to the NOT circuit 31, the second time-constant circuit and the driver DR1. Although not shown, an insulation element such as a photo coupler is provided between the current detection circuit 5 and the control circuit 3A.

Figure 9:
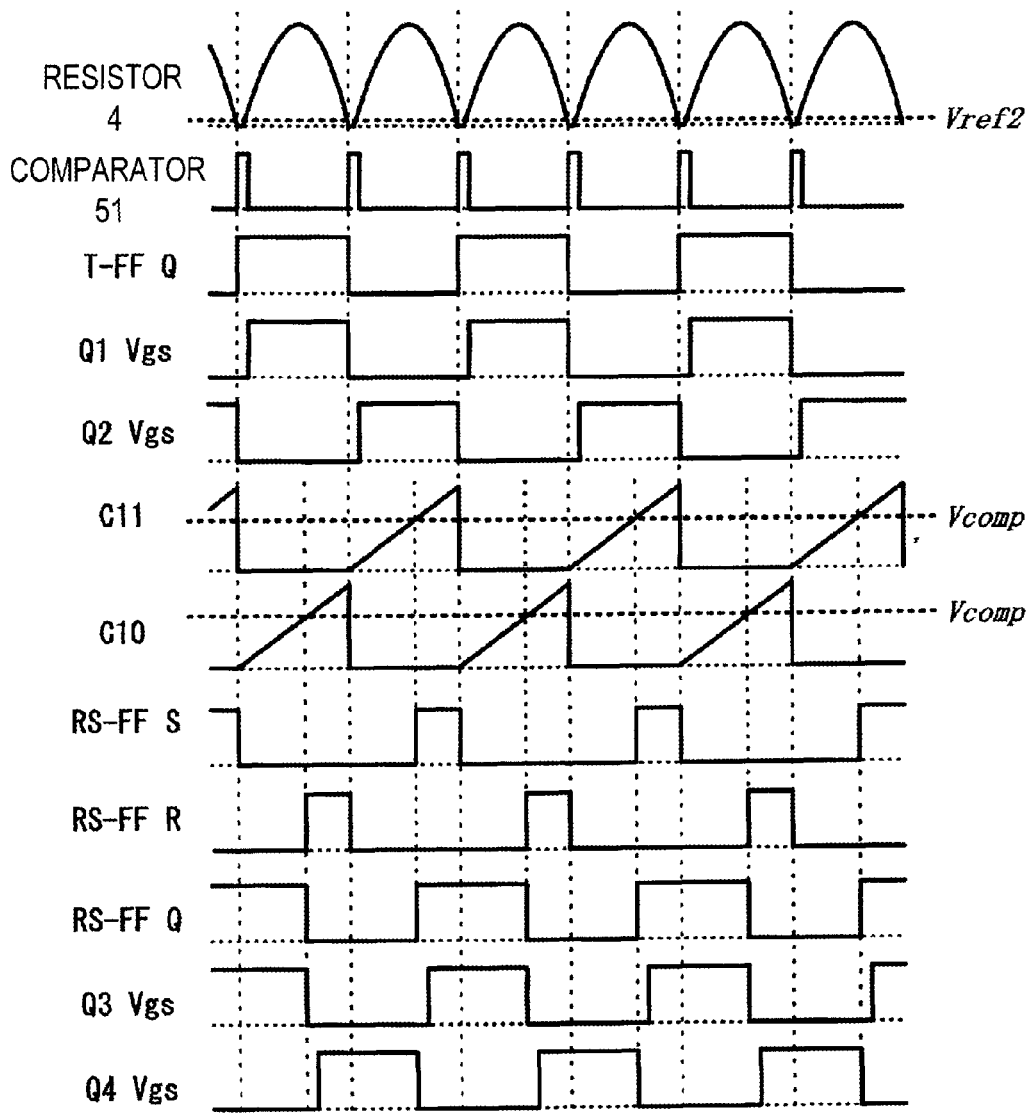
FIG. 9 illustrates an example of an operating waveform of the switching power-supply device shown in FIG. 7.

FIG. 9 illustrates an example of an operating waveform of the switching power-supply device 200 shown in FIG. 7.

The comparator 51 compares the load current having a sinusoidal waveform of the secondary side, which is converted into the voltage by the resistor 4, with the reference voltage Vref2 and then detects timing at which the load current of the secondary side substantially becomes zero.

At the timing at which the load current of the secondary side substantially becomes zero, the comparator 51 outputs a high-level signal, and then the signal is then input to the trigger terminal T of the T-FF 52. Thereby, the T-FF 52 alternately becomes on-and-off at the timing at which the load current of the secondary side substantially becomes zero.

Here, the load current flowing during the on-time period of the switching element Q1 and the load current flowing during the on-time period of the switching element Q2 alternately flow through the secondary side. Therefore, the output Q of the T-FF 52 is a high level during the on-time period of the switching element Q1 and is a low level during the on-time period of the switching element Q2, so that a signal is output at the same timing as the oscillator OSC shown in FIG. 2. Thus, the control circuit 3A uses the output Q of the T-FF 52 as the clock generated from the oscillator OSC, thereby performing the same operation as the configuration of FIG. 1.

In the switching power-supply device 200, the reference voltage Vref2 is set to be zero or to be slightly larger than zero. In this way, at the timing at which the load current flowing through the secondary side becomes zero or substantially becomes zero, it is possible to switch the output level of the T-FF 52 and to perform the zero current switching.

Also, in the switching power-supply device 200, even when the conduction angle of the load current flowing into the secondary side is changed due to the non-uniformity of the reactors L1, L2 or capacitor Cri, the output Q of the T-FF 52 is changed to an optimal frequency in correspondence to the change. Therefore, it is possible to improve the efficiency, compared to the switching power-supply device 100 having the constant operating frequency.

Also, the current detection element for detecting the load current is not limited to the resistor 4, and a current transformer, a Hall sensor and the like may be also used.

Figure 10:
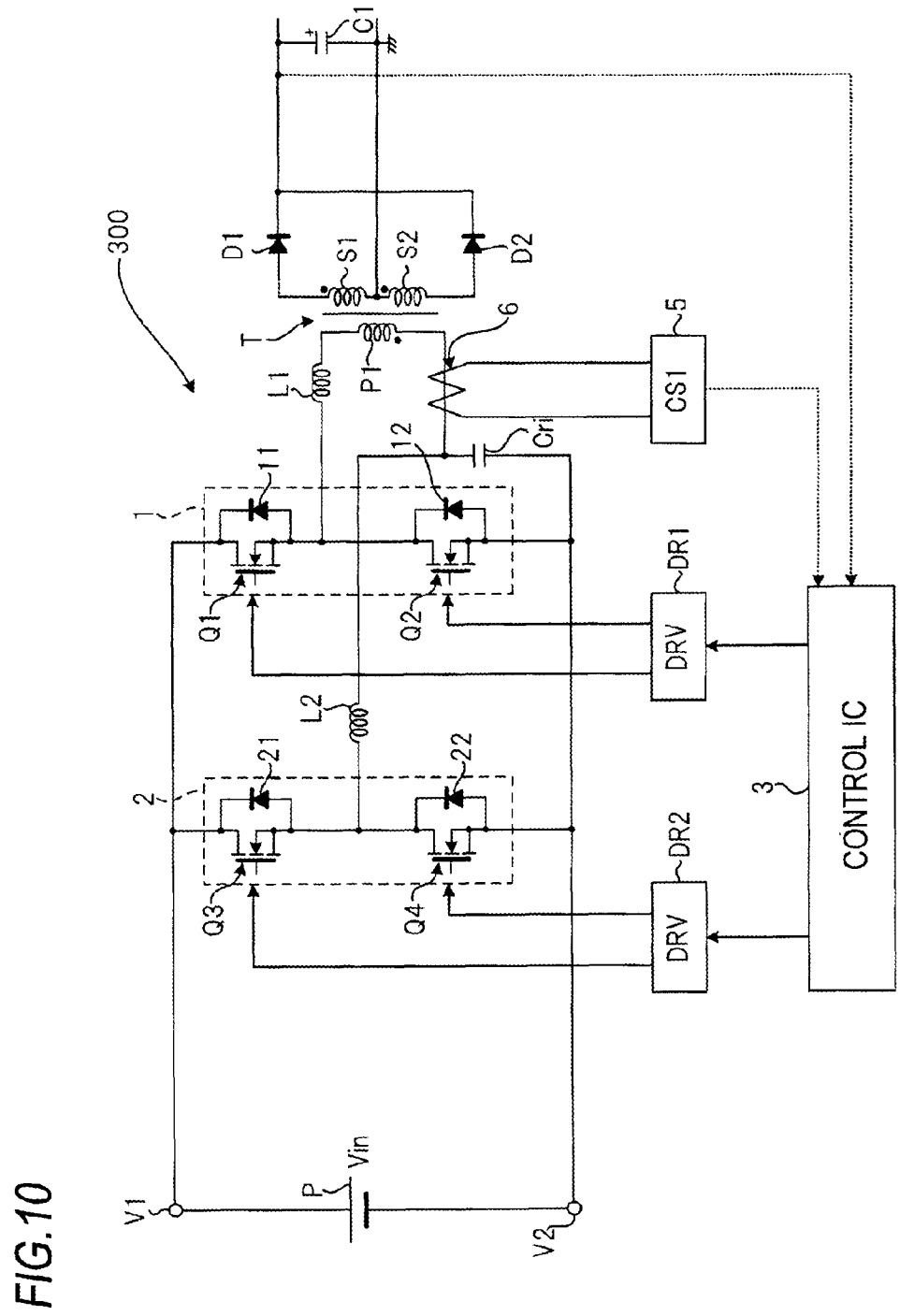
FIG. 10 illustrates a schematic configuration of a switching power-supply device that is a modified embodiment of the switching power-supply device.

FIG. 10 illustrates a schematic configuration of a switching power-supply device 300 that is a modified embodiment of the switching power-supply device 100. In FIG. 10, the same configurations as those of FIG. 7 are denoted with the same reference numerals.

The switching power-supply device 300 has the same configuration as the switching power-supply device 200, except that the resistor 4 is omitted, a current transformer 6 serving as the current detection element is added between the capacitor Cri and the primary coil P1 and the current detection circuit 5 is connected to both ends of the current transformer 6. The current transformer 6 and the current detection circuit 5 function as the detection circuit of the claims.

Like this, even when the resonance current flowing through the primary side, instead of the load current flowing through the secondary side, is detected, the timing at which the load current flowing through the secondary side substantially becomes zero is detected from the resonance current flowing through the primary side and the output level of the T-FF 52 is switched at the detected timing, the same effects as the switching power-supply device 200 can be obtained.

Figure 11:
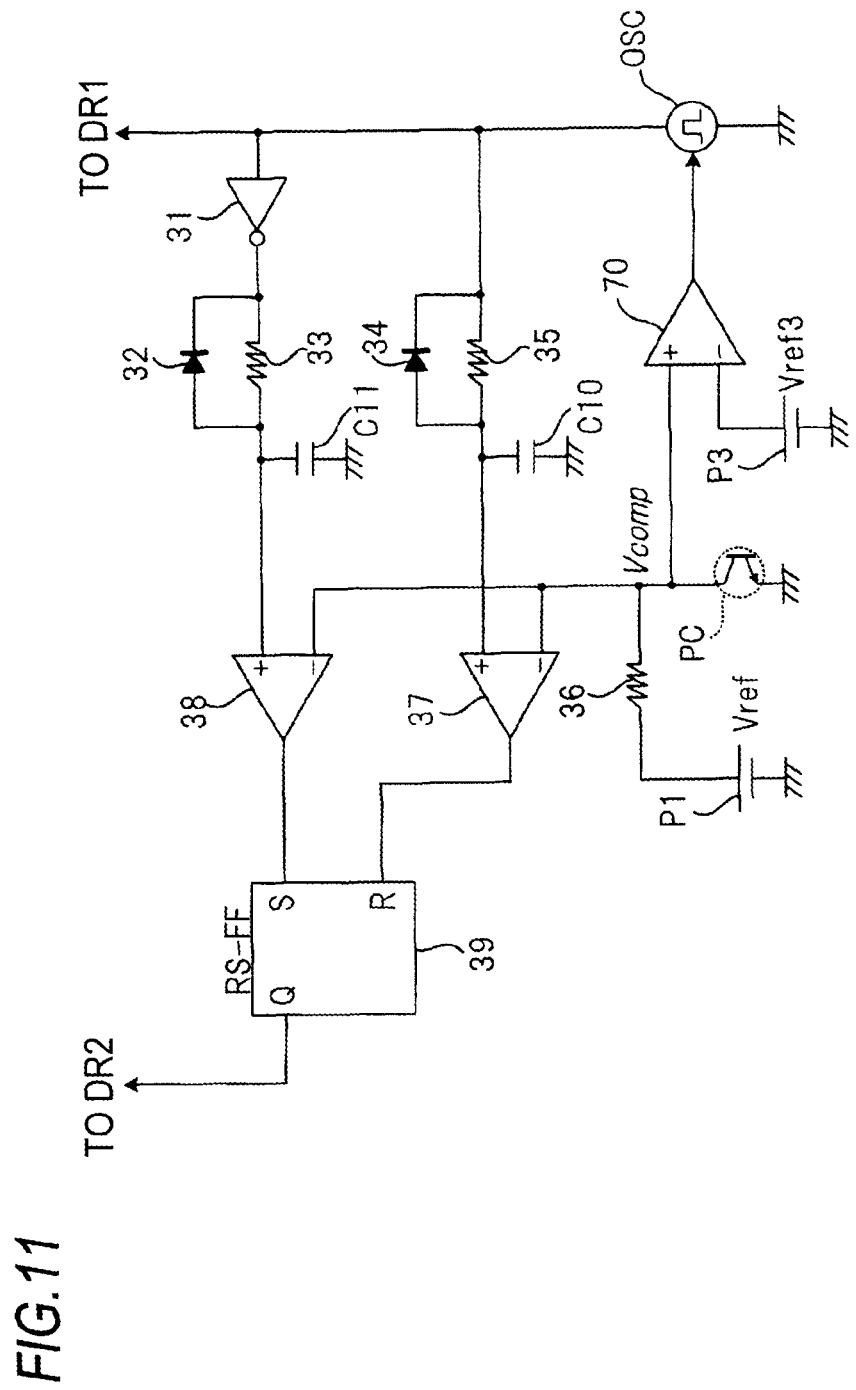
FIG. 11 illustrates a modified embodiment of the internal configuration of the control circuit of the switching power-supply device.

FIG. 11 illustrates a modified embodiment of the internal configuration of the control circuit 3 of the switching power-supply device 100.

In the control circuit 3 shown in FIG. 11, am amplifier 70 is added to the configuration of FIG. 2. The amplifier 70 has a non-inverting input terminal to which the voltage Vcomp is input and an inverting input terminal to which a reference voltage Vref3 supplied from a power supply P3 is input. An output of the amplifier 70 is connected to the oscillator OSC, and the oscillator OSC changes the oscillation frequency, according to an output signal of the amplifier 70. The reference voltage Vref3 is set to be lower than the reference voltage Vref.

In the normal input and output ranges, since an error signal that is transmitted from the secondary side is small and the current flowing through the photo coupler PC is high, the voltage Vcomp is sufficiently lower than the reference voltage Vref. On the other hand, when the input voltage is lowered or at a heavy load state, the current of the photo coupler PC is decreased, and thus the voltage Vcomp is increased. As a result, the phase difference of the switching signals of the series circuit 1 and the series circuit 2 becomes smaller, so that the power to be fed to the secondary side is increased.

However, when the input voltage is further lowered, it is not possible to completely feed the power at the secondary side even in a case where the phase difference is minimized, so that the output voltage is further lowered (the output voltage becomes lower than a target voltage (a second threshold)). In this case, since the error signal becomes zero, the voltage Vcomp becomes the reference voltage Vref. Since the reference voltage Vref3 is set to be slightly lower than the reference voltage Vref, the output of the amplifier 70 becomes a high level. The high-level signal is input from the amplifier 70, so that the oscillator OSC lowers the oscillation frequency. Thereby, the frequency of the switching signal approximates to the resonance frequency that is determined by the reactor L1, the primary inductance of the transformer T and the capacity of the capacitor Cri, and the output voltage can be controlled to be constant within the wider input voltage range.

Like this, even in a case where the phase difference is minimized, when the voltage output from the rectification-and-smoothing circuit is lower than the target voltage (the second threshold), the control circuit 3 lowers the frequencies of the switching signals of the series circuit 1 and the series circuit 2 below those of a case where the voltage output from the rectification-and-smoothing circuit is the target voltage. Thereby, the output voltage can be controlled to be constant within the wider input voltage range, compared to the case where the frequency of the switching signal is fixed.

Although this disclosure has been descried with reference to the illustrative embodiments, the illustrative embodiments are just exemplary and can be changed and implemented without departing from the scope of this disclosure.

As described above, the specification discloses followings.

A disclosed switching power-supply device includes a transformer having a primary coil and a secondary coil that is magnetically coupled with the primary coil; a first series circuit including a first switching element and a second switching element, the first series circuit being connected to both ends of a direct-current power supply; a series resonance circuit including a capacitor connected to one end of the second switching element and the primary coil connected between the capacitor and the other end of the second switching element; a second series circuit including a third switching element and a fourth switching element, the second series circuit being connected to both ends of the direct-current power supply; a reactor that is connected between a connection point of the third switching element and the fourth switching element and a terminal of the capacitor connected to the primary coil; a rectification-and-smoothing circuit that is connected to the secondary coil, and a control unit that, while making frequencies of switching signals of the first series circuit and the second series circuit be the same, performs control of: turning on-and-off the first switching element and the second switching element, alternately, with dead time at which the first switching element and the second switching element become off; and turning on-and-off the third switching element and the fourth switching element, alternately, with dead time at which the third switching element and the fourth switching element become off, wherein the control unit controls a phase difference between the switching signal of the first series circuit and the switching signal of the second series circuit.

In the disclosed switching power-supply device, the control unit controls the phase difference, according to a voltage output from the rectification-and-smoothing circuit.

In the disclosed switching power-supply device, the control unit fixes the frequency of the switching signal of the first series circuit and the frequency of the switching signal of the second series circuit.

The disclosed switching power-supply device further includes a detection circuit that detects timing at which current flowing through the rectification-and-smoothing circuit becomes a first threshold or smaller, and the control unit controls the first series circuit and the second series circuit by a switching signal synchronized with the timing.

In the disclosed switching power-supply device, the detection circuit includes a current detection element that is connected in series with the series resonance circuit or a current detection element that is connected to the rectification-and-smoothing circuit, and detects the timing based on the current detected by the current detection element.

In the disclosed switching power-supply device, if a voltage output from the rectification-and-smoothing circuit becomes lower than a second threshold voltage even in a case where the phase difference is minimized, the control unit lowers the frequencies of the switching signals of the first series circuit and the second series circuit to be lower than frequencies of a case where the voltage output from the rectification-and-smoothing circuit is the second threshold.

What is claimed is:

1. A switching power-supply device comprising:
a transformer having a primary coil and a secondary coil that is magnetically coupled with the primary coil;
a first series circuit including a first switching element and a second switching element, the first series circuit being connected to both ends of a direct-current power supply;
a first series resonance circuit including a first end of a capacitor connected to one end of the second switching element and the primary coil and a first reactor, which are connected between a second end of the capacitor and the other end of the second switching element, wherein the first series resonance circuit is connected in parallel with the second switching element;
a second series circuit including a third switching element and a fourth switching element, the second series circuit being connected to both ends of the direct-current power supply;
a second series resonance circuit including a second reactor that is connected between a connection point of the third switching element and the fourth switching element and the second end of the capacitor connected to the primary coil, wherein the second series resonance circuit is connected in parallel with the fourth switching element;
a rectification-and-smoothing circuit that is connected to the secondary coil, and
a control unit that, while making frequencies of switching signals of the first series circuit and the second series circuit be the same, performs control of:
turning on-and-off the first switching element and the second switching element, alternately, with dead time at which the first switching element and the second switching element become off; and
turning on-and-off the third switching element and the fourth switching element, alternately, with dead time at which the third switching element and the fourth switching element become off, wherein the control unit controls a current following the capacitor, by controlling a phase difference between the switching signal of the first series circuit and the switching signal of the second series circuit.

2. The switching power-supply device according to claim 1,
wherein the control unit controls the phase difference, according to a voltage output from the rectification-and-smoothing circuit.

3. The switching power-supply device according to claim 1,
wherein the control unit fixes the frequency of the switching signal of the first series circuit and the frequency of the switching signal of the second series circuit.

4. The switching power-supply device according to claim 1, further comprising
a detection circuit that detects timing at which current flowing through the rectification-and-smoothing circuit becomes a first threshold or smaller,
wherein the control unit controls the first series circuit and the second series circuit by a switching signal synchronized with the timing.

5. The switching power-supply device according to claim 4,
wherein the detection circuit includes a current detection element connected in series with the first series resonance circuit and detects the timing based on the current detected by the current detection element.

6. The switching power-supply device according to claim 4,
wherein the detection circuit includes a current detection element that is connected to the rectification-and-smoothing circuit and detects the timing based on the current detected by the current detection element.

7. The switching power-supply device according to claim 1
wherein if a voltage output from the rectification-and-smoothing circuit becomes lower than a second threshold voltage even in a case where the phase difference is minimized, the control unit lowers the frequencies of the switching signals of the first series circuit and the second series circuit to be lower than frequencies of a case where the voltage output from the rectification-and-smoothing circuit is the second threshold.

* * * * *